United States Patent [19]
Propst

[11] 3,797,540

[45] Mar. 19, 1974

[54] TIMBER HARVESTING MACHINE

[76] Inventor: Robert L. Propst, 2347 Londonderry Ave., Ann Arbor, Mich.

[22] Filed: Apr. 10, 1972

[21] Appl. No.: 242,732

[52] U.S. Cl.............................. 144/3 D, 144/2 Z
[51] Int. Cl............................................ A01g 23/08
[58] Field of Search ............. 144/2 Z, 3 D, 309 AC

[56] References Cited
UNITED STATES PATENTS

| 3,542,099 | 11/1970 | Gibson | 144/3 D |
| 3,669,161 | 6/1972 | Gutman | 144/3 D |
| 3,140,736 | 7/1964 | Propst | 144/3 D |
| 3,620,273 | 11/1971 | Propst | 144/3 D |
| 3,643,709 | 2/1972 | McColl | 144/3 D |

*Primary Examiner*—Gerald A. Dost
*Attorney, Agent, or Firm*—Olsen and Stephenson

[57] ABSTRACT

A machine for converting standing trees into logs of predetermined length comprising a tree severing and processing assembly mounted on the front end of a vehicle. The assembly includes a tree severing unit located close to the ground, an upright mast, tree gripping and feeding assemblies rotatably mounted on the mast, tree delimbers on the mast corresponding to the gripping and feeding assemblies, a tree cutoff unit, and a log storage rack arranged so that the assembly has a tree severing station and a tree processing station. At the tree severing station, the tree is severed from the ground, and lifted while being maintained in a vertical position. The severed tree is then rotated about the mast to the processing station where it is fed downwardly through a delimbing unit which functions to remove limbs from the tree and past the cutoff unit which functions to cut the tree into log lengths. The thus formed logs are then stored temporarily in the log storage rack and periodically ejected therefrom for use, such as in a pulp paper plant.

13 Claims, 10 Drawing Figures

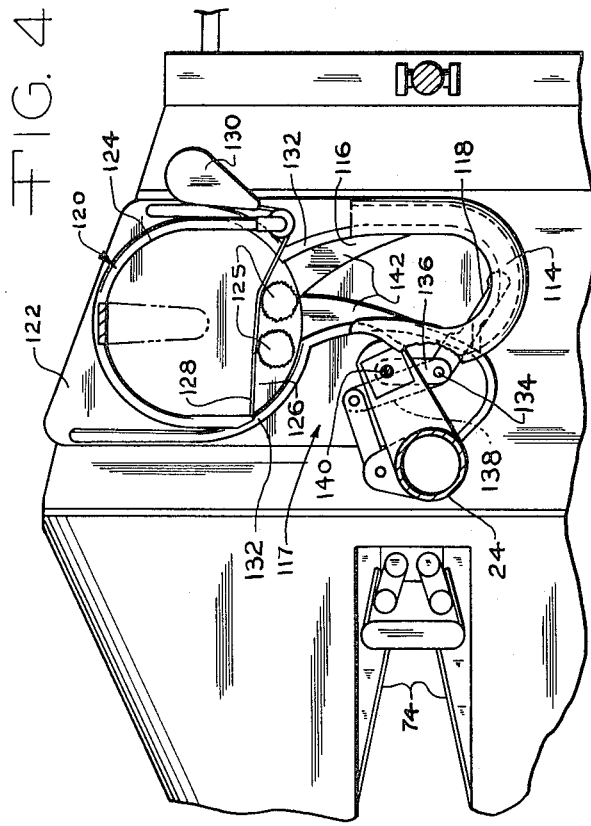
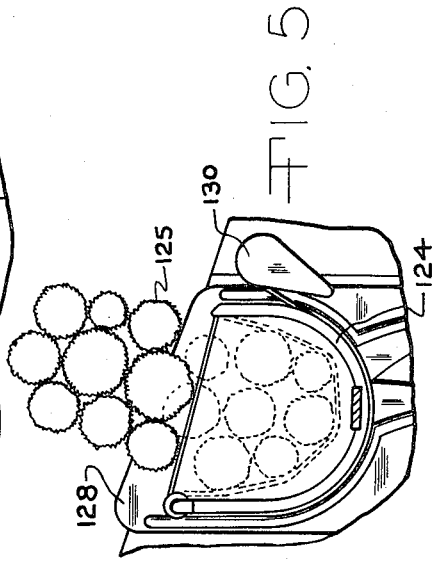
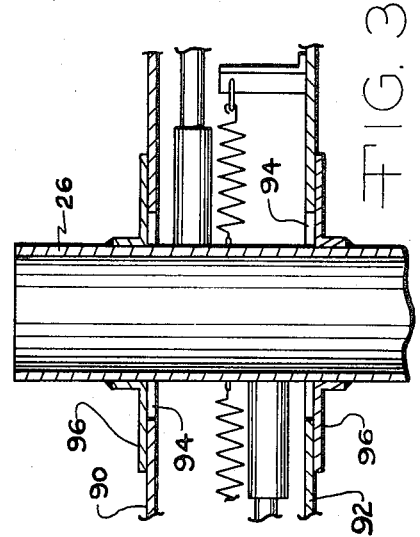
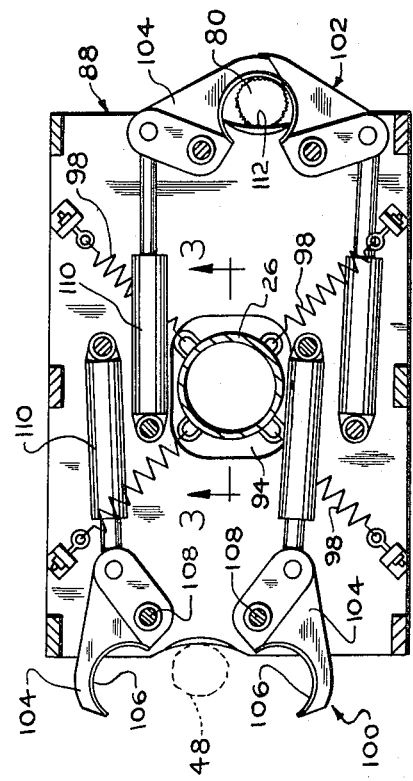
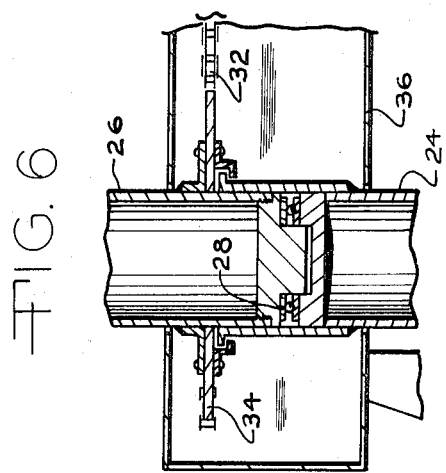

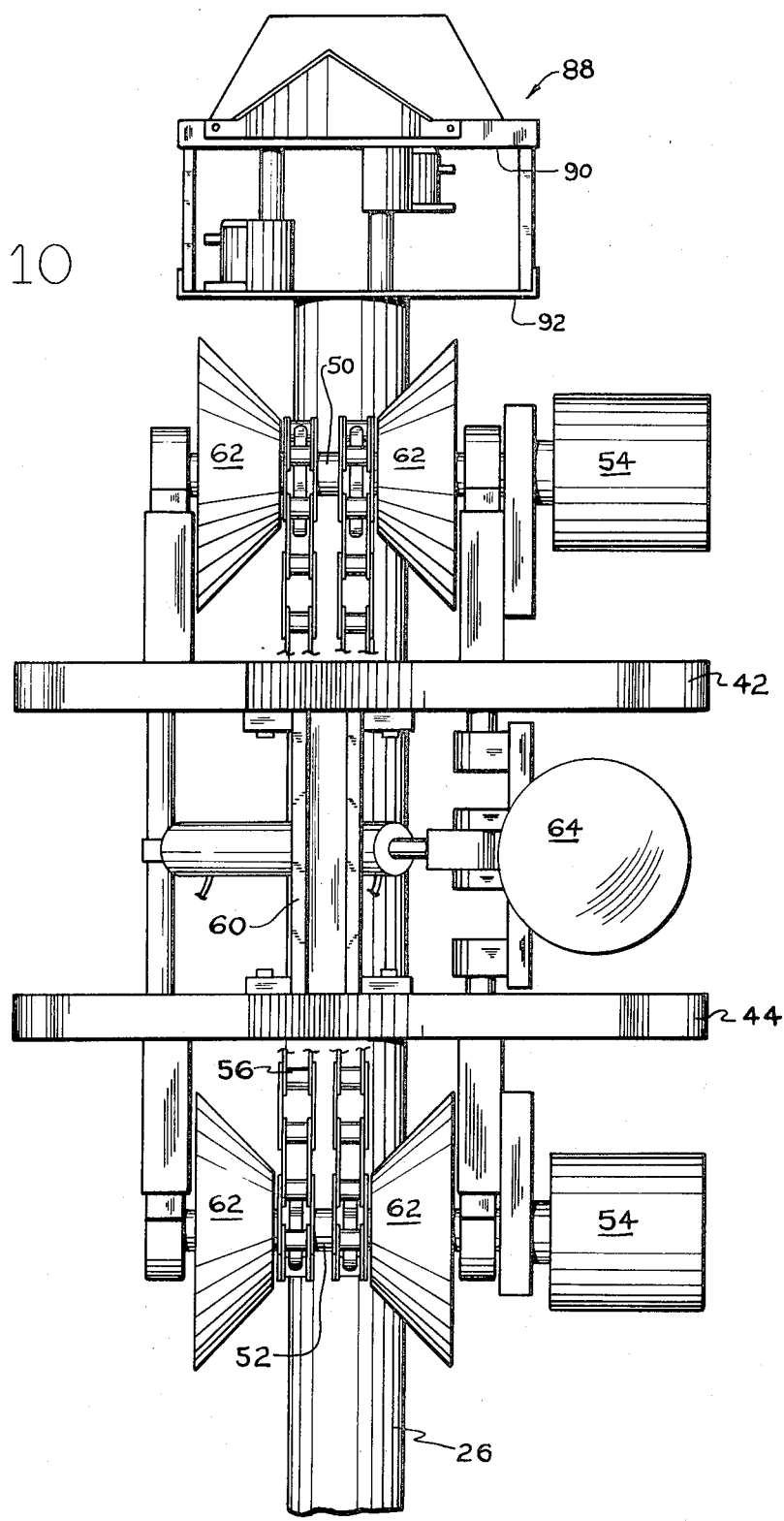

TIMBER HARVESTING MACHINE

CROSS REFERENCE TO RELATED APPLICATION.

The timber harvester disclosed in this application is an improvement on the timber harvester shown in my prior copending patent application Ser. No. 56,583 filed July 20, 1970, now U.S. Pat. No. 3,707,175.

BACKGROUND OF THE INVENTION

Large stands of timber, principally pine trees, cannot be efficiently used because equipment capable of rapidly and efficiently converting these trees to logs is not available. The principal object of this invention is to provide an improved timber harvesting machine which will meet this important need.

SUMMARY OF THE INVENTION

The timber harvesting machine of this invention consists of a tree severing and processing assembly that is mounted on the front end of a tractor so that it can be quickly positioned adjacent a tree and operated to sever the tree from the ground and convert it into logs. The assembly consists of a tree severing unit located close to the ground and capable of quickly cutting a tree, an upright mast having a rotatable upper section, tree gripping and feeding assemblies mounted on the rotatable mast section, tree delimbing units aligned with the gripping and feeding assemblies, a tree cutoff unit, and a log storage rack arranged so that the assembly has a tree severing station and a tree processing station. At the tree severing station, the tree severing unit is vertically aligned with a tree gripping and feeding assembly and a delimbing unit. A tree cut by the severing unit can thus be gripped and fed upwardly at the severing station, and then rotated around the mast to the processing station. This rotating step locates another gripping and feeding assembly and delimbing unit in line with the severing unit so that the machine can immediately move forwardly to the next tree. Concurrently, the first severed tree which is now at the processing station, is fed downwardly by the tree gripping and feeding assembly located at the processing station. During this downward movement of the tree, the delimbing unit functions to remove limbs from the tree and the cutoff unit functions to cut the tree into log lengths. A log buncher mechanism then functions to feed the logs into the log storage rack for subsequent forcible ejection.

The tree gripping and feeding assemblies are identical, each consisting of a vertically movable endless chain and a drive roller which is movable between idle and operating positions. In the idle position of the drive roller, the drive chain can be moved up against one side of a tree. The drive roller is then movable to an operating position engaging the opposite side of the tree so as to clamp it against the drive chain. The drive chain is mounted at its ends between dynamic centering roller assemblies which cooperate with the drive chain and the drive roller to provide for efficient up and down movement of a tree which may not be perfectly straight. A backup plate associated with the drive chain provides the necessary backup force for maintaining engagement of the drive chain with the tree.

The delimbing units consist of cutter jaws movable between open and closed positions with respect to a tree. These jaws are mounted on a pair of supporting plates which are in turn spring mounted on the mast so that they can shift horizontally to accommodate irregularities and curvatures in trees. This enables the delimbing units to operate efficiently over a prolonged service life.

The log feeding and bunching mechanism consists of a pivotally movable arm which functions in a timed relation with the cutoff unit to move a cutoff log horizontally into the log storage rack. A spring-pressed cable in the log storage rack functions to exert pressure on the logs as they are progressively stuffed into the log storage rack. When the log storage rack is filled with logs, it is rotated to a discharge position in which the spring-pressed cable functions to forcibly eject the logs from the rack.

The timber harvesting machine of this invention is thus operable to rapidly and efficiently move through a stand of trees, such as pine trees, and cut the trees from the ground and convert them into logs of predetermined length which can later be used for pulp wood purposes and the like.

Further objects, features and advantages of this invention will become apparent from a consideration of the following description, the appended claims, and the accompanying drawing in which:

FIG. 2 is a transverse sectional view of the delimbing assembly in the machine of this invention, as seen from substantially the line 2—2 in FIG. 1;

FIG. 3 is an enlarged fragmentary detail view of a portion of the delimbing assembly as seen from the line 3—3 in FIG. 2;

FIG. 4 is a fragmentary sectional view of the severing unit and log buncher mechanism portion of the machine of this invention as seen from substantially the line 4—4 in FIG. 1;

FIG. 5 is a view similar to FIG. 1 showing the log buncher mechanism rotated to its discharge position;

FIG. 6 is an enlarged fragmentary detail view of a portion of the mast assembly in the machine of this invention, as seen from the line 6—6 in FIG. 1;

Figure 1:
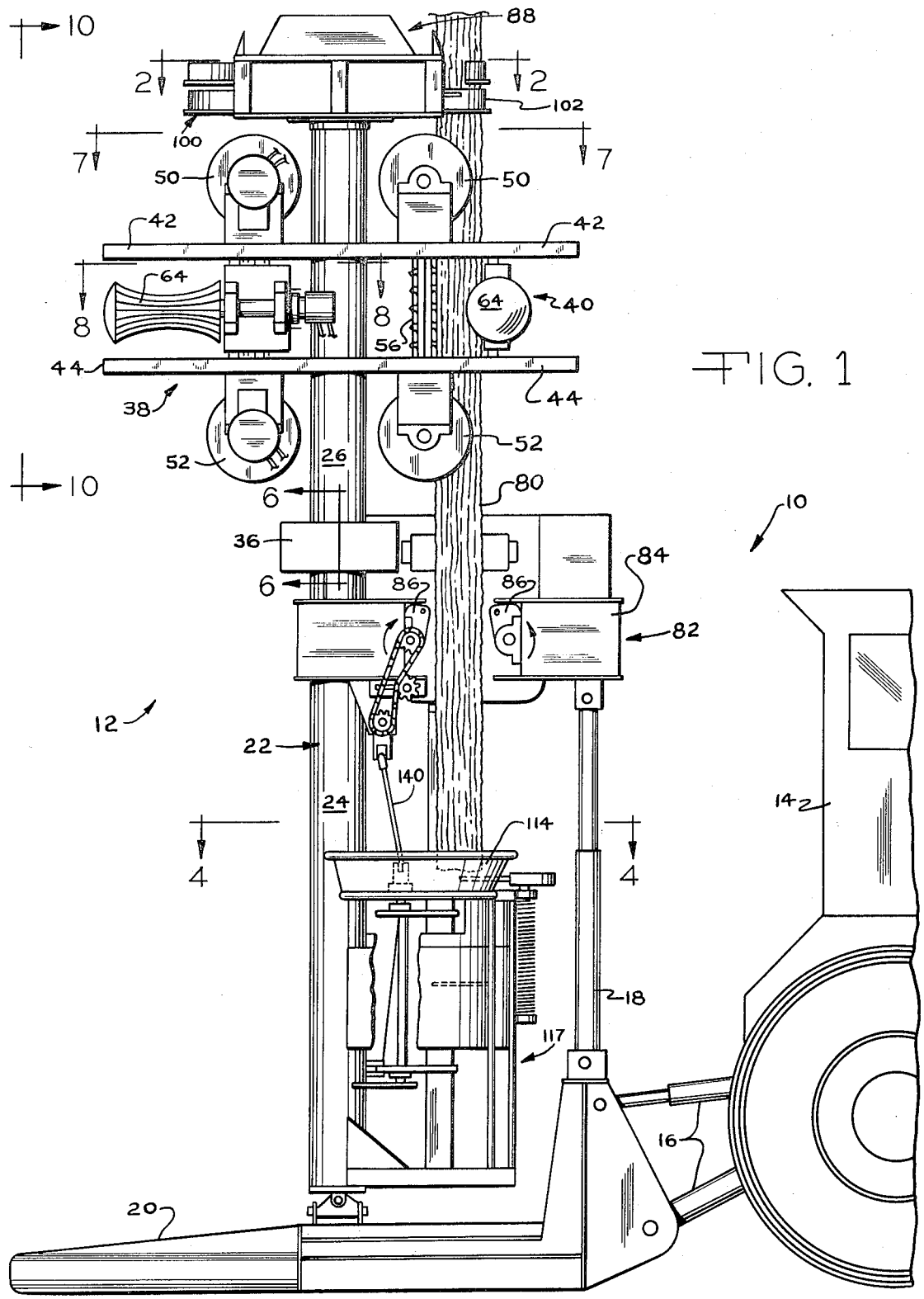
FIG. 1 is a fragmentary side elevational view of the timber harvesting machine of this invention.
Figure 7:
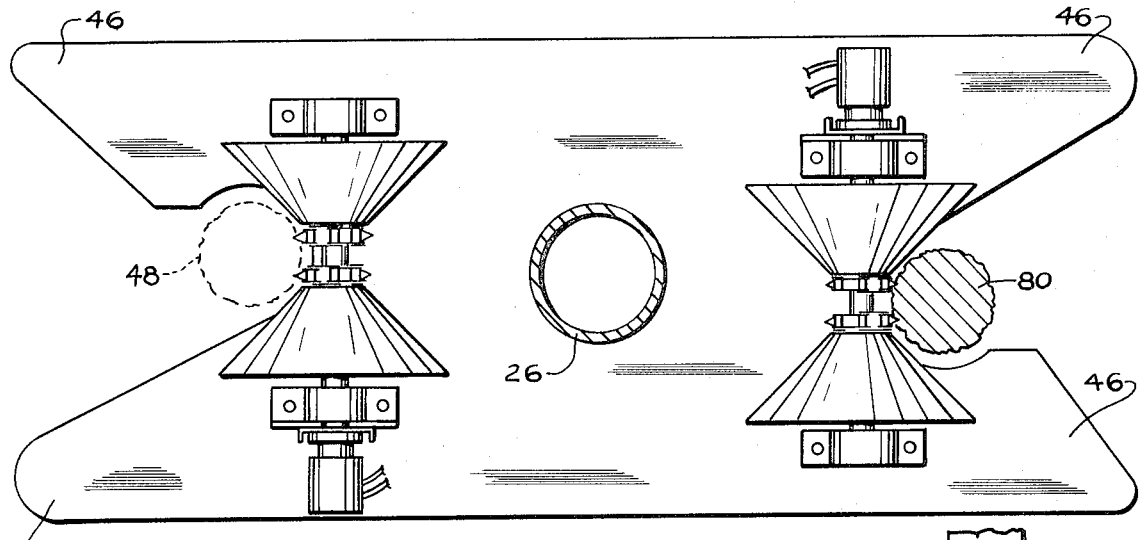
Figure 9:
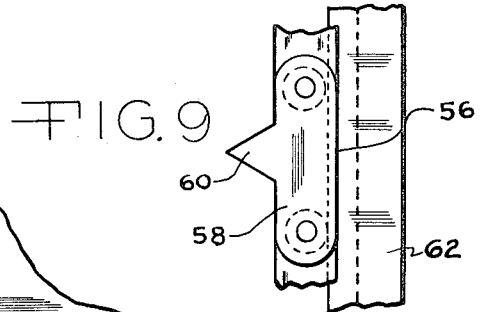
Figure 8:
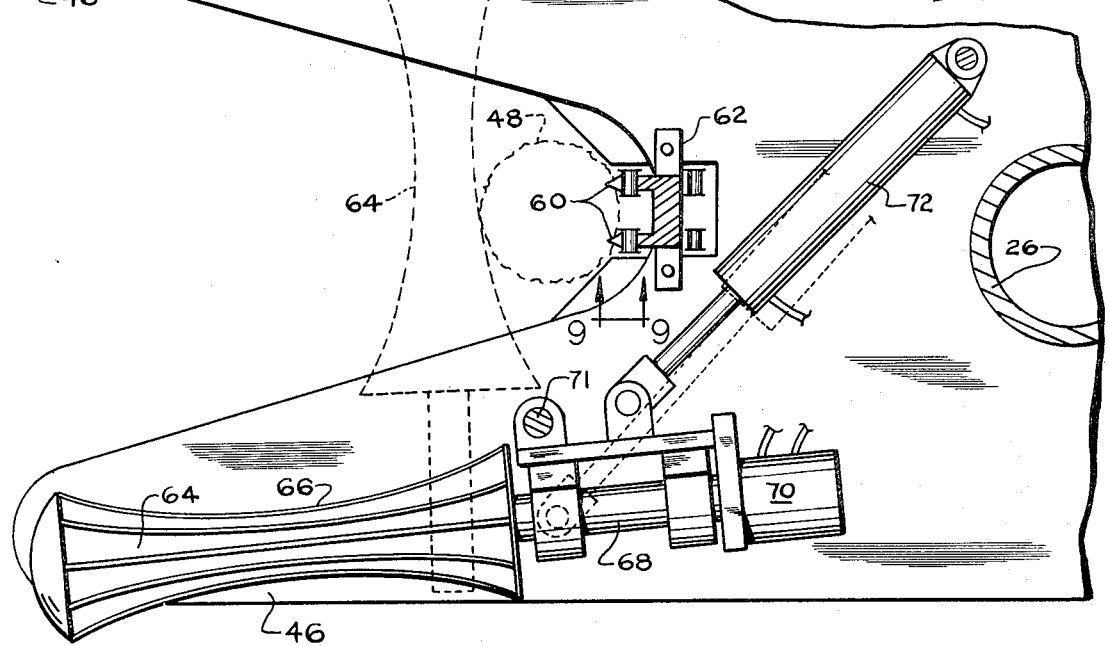

FIGS. 7 and 8 are enlarged fragmentary sectional views of the tree gripping and feeding assemblies in the machine of this invention, as seen from the lines 7—7 and 8—8, respectively, in FIG. 1;

FIG. 9 is an enlarged detail view of a portion of the drive chain in the tree gripping and feeding assembly of this invention, as seen from the line 9—9 in FIG. 8; and FIG. 10 is an enlarged fragmentary elevational view of a portion of the machine of this invention as seen from the line 10—10 in FIG. 1.

With reference to the drawing, the timber harvesting machine of this invention, indicated generally at 10, is illustrated in FIG. 1 as consisting of a tree severing and processing assembly 12 mounted on the front end of a tractor-type vehicle 14 by means of cylinder assemblies 16 which are capable of moving the assembly 12 between the operative position shown in FIG. 1 and a rearwardly moved and lowered transport position, not shown. Cylinder assemblies 18, only one of which is shown, are capable of moving the assembly 10 between vertical and slightly inclined positions to align the assembly 12 with a tree.

The assembly 12 consists of a tree severing unit 20 which is disposed adjacent the ground surface, and a generally upright mast assembly 22 which extends upwardly from the severing unit 20 and has a lower section 24 pivotally mounted directly on the severing unit 20 and an upper section 26 which is rotatably mounted on the lower section 24. As shown in FIG. 6, the upper section 26 is supported on a bearing unit 28 carried by the lower section 24. A motor unit (not shown) drives a chain 32 (FIG. 6) trained about a sprocket 34 carried by the upper mast section 26 and enclosed within a housing 36. Thus, on operation of the motor, the mast section 26 can be rotated with respect to the lower mast section 24.

A pair of identical tree gripping and feeding assemblies 38 and 40 are mounted on a pair of vertically spaced plates 42 and 44 secured to the upper mast section 26. As shown in FIGS. 7 and 8, the plates 42 and 44 are provided at their ends with diverging leg sections 46 which function to direct a tree, such as the tree indicated by the broken lines 48, into the area at the juncture of the legs 46. The tree gripping and feeding assemblies 38 and 40 operate in this juncture area and since the assemblies 38 and 40 are identical, only the assembly 38 will be described in detail with like numerals representing like parts in the assemblies.

The unit 38 consists of a pair of vertically spaced roller assemblies 50 and 52 driven by hydraulic motors 54. An endless chain 56 (FIG. 9) having links 58 provided with outwardly extending spikes 60, is trained about center portions of the roller assemblies 50 and 52. On the side of the chain 56 closest to the tree 48, a backup plate 60 (FIG. 10) extends between the plates 42 and 44 for continually holding the chain 56 in forcible engagement with the tree 48. A pair of frusto conical centering sections 62 are incorporated in each of the roller assemblies 50 and 52. Each section 62 is disposed on one side of the chain 56 and is of an increased diameter in a direction away from the chain 56. Thus, each pair of sections 62 function to dynamically center the tree 48 on the chain 56. In other words, the members 62 function to direct the tree 48 into engagement with the chain 56.

A drive roller 64 having a concaved outer surface 66 and a drive shaft 68 driven by a hydraulic motor 70 is mounted on a pivot pin 71 secured to the plates 42 and 44. A hydraulic cylinder assembly 72 is operable to move the drive roller 64 between an idle position shown in full lines in FIG. 8 and an operating position shown in broken lines in FIG. 8. In the operating position, the drive roller 64 clamps the tree 48 against the drive chain 56. The surface 66 of the drive roller 64 is formed of rubber, roughened, or provided with ribs or spikes to enable it to apply a driving vertically directed force to the tree 48. Thus, the motors 54 and 70, which are reversible motors, are operable concurrently to move the chain 56 and the drive roller 64 so as to move the tree up or down, as desired, as will be more fully explained hereinafter.

In the position of the assembly 12 shown in FIG. 1, the tree gripping and feeding assembly 38 is vertically aligned with the severing unit 20 which includes shear blades 74 (FIG. 4) that are closable on a tree, such as the one shown at 48, so as to sever the tree. Thus, the tree 48 is first positioned as shown in FIG. 8 between the plate legs 46 with the drive roller 64 in its idle position. The drive roller 64 is then moved to its operating position shown in broken lines in FIG. 8 so that it acts to pull the upper part of a standing tree into a gripped position between the chain 56 and the roller 64. The blades 74 then act to cut the gripped tree 48. The assembly 38 is then operable to move the severed tree 48 upwardly while maintaining the tree in a vertical position since the tree is effectively gripped along one side by the chain 56 and on the other side by the roller 64. The mast section 26 is then rotated through an angle of 180° to position the tree 48 in the position illustrated by the tree 80 shown in solid lines in FIG. 1. In the FIG. 1 illustration, the tree 80 has been subjected to the above-described cycle with the assembly 40 starting in the position illustrated for the assembly 38. The assembly 40 in the position of the assembly 12 shown in FIG. 1 is vertically aligned with a tree cutoff unit 82 consisting of a frame 84 secured to the lower mast section 24 and rotatably supporting a pair of cutoff blade structures 86. The assembly 40 is operable to feed the tree 80 downwardly between the blade structures 86 which are rotatable in the relatively opposite directions indicated by the arrows in FIG. 1 so that the blades 86 move through the tree 80 and operate to cut the tree 80 into log lengths. For a detailed description of the unit 82 reference is made to my copending application Ser. No. 242,731, filed Apr. 10, 1972.

A delimbing assembly 88 (FIG. 1) is mounted on the mast section 26 at a position above the gripping and feeding assemblies 38 and 40. The function of the assembly 88 is to remove limbs and branches from trees during their downward movement between the blade structures 86. The assembly 88 consists of a pair of vertically spaced plates 90 and 92 having central openings 94 which are substantially larger than the mast section 26 to enable slidable mounting of the plates 90 and 92 on brackets 96 secured to the mast section 26. A plurality of tension springs 98 extend between the mast section 26 and the plates 90 and 92 so as to normally maintain the plates in centered positions with respect to the mast section 26. However, the springs 98 function to permit horizontal shifting movement of the plates 90 and 92 relative to the mast 26 for a purpose to appear presently. Mounted on and disposed between the plates 90 and 92 are delimber units 100 and 102. The units 100 and 102 are identical and positioned in vertical alignment with the gripping and feeding assemblies 38 and 40. Since the units 100 and 102 are identical, only the unit 100 will be described in detail with like numerals representing like parts on the two units.

The unit 100 consists of a pair of jaws 104 having upwardly facing arcuate cutting edges 106. Each jaw is pivotally mounted on a pin 108 carried by and extending between the plates 90 and 92 for movement between an open position shown in FIG. 2 for the unit 100 and a closed position shown in FIG. 2 for the unit 102. A hydraulic cylinder assembly 110 mounted on the plates 90 and 92 and pivotally connected to a jaw 104 is operable to move the jaw between open and closed positions. In the closed positions of the jaws 104 they cooperate with cutting edges 112 on the plates 90 and 92 to cut all limbs and branches from the tree 80 during its downward movement through the unit 100 or 102.

A stuffer funnel 114 is located below and in a vertical alignment with the cutoff unit 82. As shown in FIG. 4, the funnel 114 is generally U-shape having an open side 116. The funnel 114 operates to direct logs cut by the blades 86 into a log buncher mechanism indicated generally at 117. The funnel 114 directs a log 125 into the path of a paddle 118 so that the paddle 118 can in turn function to push the log into a log storage rack 120 located below and to one side of the cutoff unit 82. The log storage rack 120 consists of a base 122 and a rotatable generally U-shape open frame 124 which has an open side 126. A cable 128 from a spring-pressed storage reel 130 extends across the open side 126 when the frame 124 is substantially empty, as shown in FIG. 4. When the frame 124 becomes filled with logs, as shown in FIG. 5, the cable 128 is pushed into the frame 124 and away from the open side 126. However, the cable 128, by virtue of the spring pressure on the reel 130, continually urges the logs toward the open side 126 of the frame 124 and aligns the logs in a vertical position as they are forced into the log storage rack 120. As a result, when the frame 124 is rotated to its discharge position shown in FIG. 5, the spring-pressed reel 130 is unreeled to its fullest extent thereby pulling the cable taut across the open side 126 of the U-shaped frame 124 and forcibly ejecting the logs. The frame 124 can then be returned to its loading position shown in FIG. 4 in which the open side 126 is closed by guide frame members 132 which direct logs from the paddle 118 into the frame 124.

As shown in FIG. 4, the paddle 118 is pivotally connected at 134 to a crank 136 and an arm 138. The crank 136 is driven by a drive shaft 140 connected to and driven by the tree cutoff unit 82. As a result of the drive shaft 140 rotating, the crank 136 and the arm 138 operate to move the paddle 118 along the guide members 132 so as to push a severed section of the log from the stuffer funnel 114 into the frame 124 as shown in FIG. 4, and return the paddle 118 to its ready position shown in FIG. 4. A pair of pivoted spring loaded dogs 142 on the guide frame members 132 are normally closed as shown in FIG. 4 but are movable away from each other by a log being moved by the paddle 118 to permit the log to travel into the frame 124. The dogs 142 automatically return to thier closed positions shown in FIG. 4 once the log 125 has been pushed into the frame 124 to prevent return of the log.

In the operation of the machine 10, the severing unit 20 and one of the gripping and feeding assemblies 38 and 40 (the assembly 38 in the position of the assembly 12 shown in FIG. 1) cooperate to form a tree severing station in the machine 10, namely, a location on the machine 10 where the tree is cut from the ground. The delimbing unit 102, the gripping and feeding assembly 40 and the cutoff unit 84 cooperate to form a processing station in the machine 10, namely, a location on the machine 10 where the tree 80 is processed into logs 125. Assume that the tree 80 has been cut at the severing station, gripped by the assembly 40, moved upwardly by the assembly 40 and rotated to the position shown in FIG. 1 and that the assembly 40 is now operating to feed the tree 80 downwardly between the cutter blades 86. During downward movement of the tree 80, the delimber unit 102 removes limbs and branches from the tree and the cutter blades 86 operate to cut the tree 80 into logs 125 of predetermined length. The paddle 118 is operated following each cutting stroke of the blades 86 to push the thus formed log 125 from a position below the blades 86 to an out of the way stored position in the frame 124. When the frame 124 becomes full of logs 125 as shown in FIG. 5 it is moved to the discharge position shown in FIG. 5 and the logs are discharged. Concurrently with processing of the tree 80, the machine 10 can be moved forwardly to sever another tree and locate it as indicated for the tree 48 shown in dotted lines in FIG. 8. As soon as processing of the tree 80 is completed, the assembly 12 is operated to commence processing of the next tree 48. During severing and processing, the gripping and feeding assemblies 38 and 40 operate to efficiently move the tree up or down, as desired, and by virtue of the engagement of a vertically extending surface on the tree by the chain 56, the desired control of the tree is maintained at all times. Also, this arrangement enables an assembly 38 or 40 to accommodate a tree with some curves and twists in it, without losing control of the tree. The shiftable mounting of the delimber assembly 88 accomplishes a similar purpose.

What is claimed is:

1. In a timber harvesting machine having an upright mast assembly, a tree gripping and feeding assembly mounted on said mast assembly and comprising a pair of vertically spaced roller assemblies mounted for rotation about generally horizontal axes, an endless drive chain trained about said roller assemblies, a drive roller movably mounted for movement in a generally horizontal plane disposed between said axes, said drive roller having an axis and being movable between an operating position in which the axis thereof is generally parallel to said axes and an idle position to one side of said operating position, said drive roller being operable in said operating position to clamp a tree against said drive chain, and motor means operable to drive at least one of said roller assemblies so as to move said drive chain in a generally vertical direction.

2. A tree gripping and feeding assembly according to claim 1 wherein each of said roller assemblies includes dynamic tree centering members, each of said centering members being generally frusto conical in shape, said centering members being mounted in pairs on opposite sides of said drive chain so that the diameters of said centering members increase in directions extending away from said chain whereby said centering members direct a tree toward a centered position engaged with said chain.

3. A tree gripping and feeding assembly according to claim 1 further including a pair of vertically spaced supporting plates mounted on said mast assembly, each of said plated having forwardly diverging leg portions, said drive chain being located substantially at the juncture of said leg portions, one of said roller assemblies being located above said pair of plates and the other roller assembly being located below said pair of plates, said drive roller being located between said plates.

4. A tree gripping and feeding assembly according to claim 3 further including means pivotally supporting said drive roller on one of said plates for movement between said operating and idle positions, and fluid actuated cylinder means mounted on said one plate and connected to said drive roller for pivotally moving said drive roller between said operating and idle positions.

5. A tree gripping and feeding assembly according to claim 4 wherein said drive roller has an inwardly concaved external surface, and further including motor means for rotating said drive roller so that said concave face will move along a tree gripped between said drive chain and said drive roller.

6. A tree gripping and feeding assembly according to claim 3 further including a backup plate secured to and extending between said plates at a position between said roller assemblies, said backup plate being operable to engage said drive chain to preclude rearward movement thereof in a direction away from said drive roller in the operating position thereof.

7. In a timber harvesting machine, a tree severing unit, an upright mast assembly extending upwardly from said severing unit, said mast assembly including an upper rotatable section, a pair of tree gripping and feeding assemblies mounted on said upper mast section so that said assemblies are spaced substantially 180° apart on said mast section, a tree cutoff unit disposed below said upper mast section and spaced above said severing unit and substantially 180° on said mast from said severing unit, a tree delimbing assembly mounted on said upper mast section above said gripping and feeding assemblies, said delimbing assembly comprising a pair of delimber units each of which is engageable with a tree trunk so that when the trunk is moved vertically past the unit limbs thereon are cut therefrom, said delimber units being arranged in generally vertical alignment with said gripping and feeding assemblies, and means for rotating said upper mast section between a first position in which one of said gripping and feeding assemblies is in substantial vertical alignment with said severing unit and the other one of said gripping and feeding assemblies is in substantial vertical alignment with said cutoff unit to a second position in which said other gripping and feeding assembly is in substantially vertical alignment with said severing unit and said one gripping and feeding assembly is in substantial vertical alignment with said cutoff unit, whereby a tree severed by said severing unit when said upper mast section is in said first position can be gripped by said one feeding and gripping assembly and moved with said upper mast section to said second position thereof in which said cutoff unit is operable to cut off said tree and a delimbing unit aligned with said one gripping and feeding assembly is operable to remove limbs from the tree during downward feeding of the tree by said one gripping and feeding assembly, said second gripping and feeding assembly being concurrently operable to grip another tree severed by said severing unit.

8. A timber harvesting machine according to claim 7 wherein each of said delimber units includes cutter jaws movable between open and closed positions, said jaws in the closed positions thereof being engageable with a tree trunk, and a supporting frame for said jaws mounted on said upper mast section for horizontal shifting movement relative to the mast section so that said jaws in the closed positions thereof can accommodate irregularities and curvatures in a tree being moved through said closed jaws.

9. A timber harvesting machine according to claim 8 wherein said supporting frame comprises plate means slidably mounted on said upper mast section for slidable movement transversely thereof, and spring means extending between said mast section and said plate means normally maintaining said plate means in a predetermined position relative to said mast means and allowing yieldable movement of said plate means from said predetermined position.

10. In a timber harvesting machine, a mast assembly, a tree gripping and feeding assembly mounted on said mast assembly for feeding a tree in a downward direction, a tree cutoff unit mounted on said mast assembly below said gripping and feeding assembly and operable to cut a tree fed thereto into logs of substantially equal length, a log storage rack located below and to one side of said cutoff unit, said rack comprising an upright frame having an open side, and arm means operable to push a log cut by said cutoff unit horizontally through said open side of said frame into said log storage rack.

11. A timber harvesting machine according to claim 10 wherein said log storage rack comprises a fixed position base, said upright frame being pivotally mounted on said base, a spring-pressed cable extended across said open side of said frame, and means for moving said frame between a loading position in which said open side faces inwardly in the direction of said arm means so that logs pushed by said arm means can move into said frame, and a discharge position in which said open side faces outwardly for discharging logs from said storage rack.

12. A timber harvesting machine according to claim 11 wherein said spring-pressed cable means is forced inwardly by logs pushed into said frame by said arm means, said cable means being operable to forcibly eject logs from said frame in the discharge position thereof.

13. A timber harvesting machine according to claim 12 further including a stuffer funnel disposed below said tree cutoff unit in substantial vertical alignment therewith, said funnel being located above said arm means and being operable to direct logs from said cutoff unit into the path of said arm means which is in turn operable to push the log into said storage rack.

* * * * *